(12) United States Patent
Magdych et al.

(10) Patent No.: US 8,176,553 B1
(45) Date of Patent: May 8, 2012

(54) SECURE GATEWAY WITH FIREWALL AND INTRUSION DETECTION CAPABILITIES

(75) Inventors: James S. Magdych, Chino, CA (US); Tarik Rahmanovic, Germantown, MD (US); John R. McDonald, Jacksonville, FL (US); Brock E. Tellier, Stamford, CT (US); Anthony C. Osborne, Sydney (AU); Nishad P. Herath, Sydney (AU)

(73) Assignee: McAfee, Inc., Santa Clara, CA (US)

( * ) Notice: Subject to any disclaimer, the term of this patent is extended or adjusted under 35 U.S.C. 154(b) by 2736 days.

(21) Appl. No.: 10/294,255

(22) Filed: Nov. 13, 2002

Related U.S. Application Data

(63) Continuation of application No. 09/895,500, filed on Jun. 29, 2001, now Pat. No. 6,513,122.

(51) Int. Cl.
*G06F 11/00* (2006.01)
(52) U.S. Cl. ........................................... 726/23
(58) Field of Classification Search ............ 726/1, 11–13, 726/22–26; 713/188, 153; 709/223, 224
See application file for complete search history.

(56) References Cited

U.S. PATENT DOCUMENTS

| | | | |
|---|---|---|---|
| 5,319,776 A | 6/1994 | Hile et al. | 395/575 |
| 5,414,650 A | 5/1995 | Hekhuis | 364/715.02 |
| 5,606,668 A | 2/1997 | Shwed | |
| 5,621,889 A | 4/1997 | Lermuzeauz et al. | 395/186 |
| 5,623,601 A | 4/1997 | Vu | 395/187.01 |
| 5,649,095 A | 7/1997 | Cozza | 395/183.15 |
| 5,787,253 A | 7/1998 | McCreery et al. | 395/200.61 |
| 5,799,002 A | 8/1998 | Krishnan | 370/234 |
| 5,826,014 A | 10/1998 | Coley et al. | |
| 5,828,846 A | 10/1998 | Kirby et al. | 395/200.68 |
| 5,835,726 A | 11/1998 | Shwed et al. | 395/200.59 |
| 5,884,025 A | 3/1999 | Baehr et al. | |
| 5,892,903 A * | 4/1999 | Klaus | 726/25 |
| 5,898,830 A | 4/1999 | Wesinger, Jr. et al. | |
| 5,913,041 A | 6/1999 | Ramanathan et al. | 395/200.63 |
| 5,919,258 A | 7/1999 | Kayashima et al. | |
| 5,968,176 A | 10/1999 | Nessett et al. | |
| 6,052,788 A | 4/2000 | Wesinger, Jr. et al. | 713/201 |
| 6,061,798 A | 5/2000 | Coley et al. | 713/201 |
| 6,098,172 A | 8/2000 | Coss et al. | 713/201 |

(Continued)

FOREIGN PATENT DOCUMENTS

EP 0712220 11/1994

(Continued)

OTHER PUBLICATIONS

Arnt Brox, Signature-Based or Anomaly-Based intrusion detection: The practice and pitfalls, SC Magazine, May 2002.*

(Continued)

*Primary Examiner* — Beemnet Dada
(74) *Attorney, Agent, or Firm* — Wang, Cabello, Lutsch, Rutherford & Brucculeri, LLP

(57) ABSTRACT

A system, method and computer program product are provided. Initially, data is received from a remote source which is destined for a target. A portion of such data is discarded based on a predetermined set of rules utilizing a firewall. Further, the data is compared to a predetermined list of data associated with attacks utilizing an intrusion detection system. Based on the comparison, some of the data is marked as hostile. The data that is marked as hostile is then acted upon in order to prevent an attack.

20 Claims, 7 Drawing Sheets

U.S. PATENT DOCUMENTS

| | | | |
|---|---|---|---|
| 6,119,165 A | 9/2000 | Li et al. ............... | 709/229 |
| 6,119,236 A | 9/2000 | Shipley | |
| 6,128,298 A | 10/2000 | Wootton et al. | |
| 6,182,226 B1* | 1/2001 | Reid et al. ............... | 726/15 |
| 6,205,551 B1 | 3/2001 | Grosse ............... | 713/201 |
| 6,219,786 B1 | 4/2001 | Cunningham et al. | |
| 6,222,856 B1 | 4/2001 | Krishnan et al. ............... | 370/468 |
| 6,253,337 B1 | 6/2001 | Maloney et al. | |
| 6,263,444 B1 | 7/2001 | Fujita ............... | 713/201 |
| 6,275,942 B1 | 8/2001 | Bernhard et al. | |
| 6,279,113 B1 | 8/2001 | Vaidya ............... | 713/201 |
| 6,298,445 B1 | 10/2001 | Shostack et al. | |
| 6,301,668 B1 | 10/2001 | Gleichauf et al. | |
| 6,301,688 B1 | 10/2001 | Roy ............... | 716/4 |
| 6,321,336 B1 | 11/2001 | Applegate et al. ............... | 713/201 |
| 6,370,648 B1 | 4/2002 | Diep ............... | 713/201 |
| 6,393,568 B1 | 5/2002 | Ranger et al. | |
| 6,487,666 B1 | 11/2002 | Shanklin et al. | |
| 6,499,107 B1 | 12/2002 | Gleichauf et al. | |
| 6,513,122 B1 | 1/2003 | Magdych et al. ............... | 713/201 |
| 6,550,012 B1 | 4/2003 | Villa et al. ............... | 713/201 |
| 6,597,687 B1 | 7/2003 | Rao ............... | 370/352 |
| 6,598,034 B1 | 7/2003 | Kloth ............... | 706/47 |
| 6,615,358 B1 | 9/2003 | Dowd et al. ............... | 713/201 |
| 6,711,127 B1 | 3/2004 | Gorman et al. ............... | 370/230 |
| 6,728,885 B1 | 4/2004 | Taylor et al. | |
| 6,990,591 B1 | 1/2006 | Pearson | |
| 7,000,247 B2 | 2/2006 | Banzhof ............... | 726/2 |
| 7,020,895 B2 | 3/2006 | Albrecht | |
| 7,058,976 B1* | 6/2006 | Dark ............... | 726/23 |
| 7,237,264 B1* | 6/2007 | Graham et al. ............... | 726/23 |
| 2002/0131366 A1 | 9/2002 | Sharp et al. ............... | 370/235 |
| 2003/0023873 A1* | 1/2003 | Ben-Itzhak ............... | 713/201 |
| 2003/0110394 A1 | 6/2003 | Sharp et al. ............... | 713/200 |
| 2004/0131056 A1 | 7/2004 | Dark ............... | 370/386 |
| 2004/0146006 A1 | 7/2004 | Jackson ............... | 370/230 |

FOREIGN PATENT DOCUMENTS

| | | |
|---|---|---|
| EP | 0851653 | 7/1998 |
| EP | 0903921 | 3/1999 |
| JP | 08186569 | 7/1996 |
| WO | WO 97/03549 | 2/1997 |
| WO | WO 00/11841 | 3/2000 |
| WO | 0034867 A1 | 6/2000 |
| WO | WO 00/34867 | 6/2000 |
| WO | WO 01/16664 | 3/2001 |

OTHER PUBLICATIONS

"Substitute Magdych Substantive Motion 1" Zilka-Kotab, PC, Mar. 7, 2005, Patent Interference No. 105,271.
David H. Tannenbaum, "The Party Dark's Motion 1" United States Patent and Trademark Office, Feb. 1, 2005.
David H. Tannenbaum, "The Party Dark's Motion 2" United States Patent and Trademark Office, Feb. 1, 2005.
Ishibashi et al. "A Protection Method against Unauthorized Access and Address Spoofing for Open Network Access Systems" IEEE 2001.
Schanckenberg and Djahandari, "Infrastructure for Intrusion Detection and Response" IEEE 1999.
Daemon9, "IP-Spoofing Demystified: Trust-Relationship Exploitation" Phrack Magazine, Jun. 1996 Guild Productions, kid.
Datamation, "Sleuth 9" Jupitermedia Corporation, 2003.
Kanlayasiri et al. "Detecting Denial of Service using BENEG Model: An Alternative Approach" Applied Network Research Group, Dept. of Computer Engineering.
Sean Whalen, "An Introduction to Arp Spoofing" Apr. 2001.
Susan Pittmane Dark, "Intelligent Feedback Loop Process Control System", U.S. Appl. No. 09/572,112, filed May 17, 2000.
Protest Under 37 CFR § 1.291(a) filed in U.S. Appl. No. 09/572,112 on Mar. 25, 2005.
McAfee, Inc., Anti-Virus Solutions, 1997, USA (12 pages).
Network Associates Technology, Inc., Gauntlet for Windows NT Administrator's Guide, Version 5.5, 1996-1999, USA (346 pages).
Trusted Information Systems, Inc., Gauntlet Firewall Administrator's Guide, Version 4.1, 1996-1998, USA (328 pages).
Symantec Corporation, Norton AnitVirus for Firewalls, Administrator's Guide, 1997, Peter Norton Group, Cupertino, California (29 pages).
Symantec Corporation, Understanding Symantec's Anit-virus Strategy for Internet Gateways, The Symantec Enterprise Papers, vol. XXX, 1997, USA (14 pages).
Symantec Corporation, Norton AntiVirus for Firewalls, 1995-1999, retrieved from http://web.archive.org/web/19990504230135/www.symantec.com (4 pages).
Symantec Corporation, News Release, Symantec Announces Norton Antivirus for Firewalls for Maximum Protection From Internet-Borne Viruses, May 6, 1997, Cupertino, California, retrieved from www.symantec.com (5 pages).
Network Associates, Inc., Gauntlet Firewall for Windows NT Administrator's Guide, Version 5.0, 1998-1999, USA (289 pages).
Network Associates Technology, Inc., Gauntlet Firewall for UNIX Administrator's Guide, Version 5.5, 1996-1999, USA (274 pages).
Network Associates, Inc., Gauntlet Firewall for Windows NT Administrator's Guide, Version 2.1, 1997-1998, USA (232 pages).
Network Associates, Inc., Gauntlet Firewall for Windows NT Administrator's Guide, Version 3.0, 1997-1998, USA (278 pages).
Network Associates Technology, Inc., McAfee Internet Guard Dog Pro, 2000, USA (6 pages).
Network Associates, Inc., McAfee, Internet Guard Dog User's Guide, Version 3.1, Jun. 2000, USA (88 pages).
Network Associates, Inc., McAfee Firewall Getting Started, Version 2.10, May 2000, USA (48 pages).
Network Associates, Inc., McAfee VirusScan for Windows 95 and Windows 98 User's Guide, Version 5.0, Feb. 2000, USA (246 pages).
Ferrari, J. et al., Guarding the Gates Using the IBM eNetwork Firewall V3.3 for Windows NT, International Technical Support Orginzation, IBM, Jul. 1999, USA (654 pages).
Integralis Ltd., MIMEsweeper Administrator's Guide Version 3.1, Revision 1.1, 1997, USA (397 pages).
McAfee, Inc., User's Guide- VirusScan for Windows NT, v2.5.2, Feb. 1997, USA (114 pages).
McAfee Associates, Inc., User's Guide- WebWall, Version 1.0.0, Aug. 1997, USA (226 pages).
McAfee, Inc., User's Guide- PC Firewall for Windows 3.1x, Windows 95, and Windows NT, Version 1.0.0, Oct. 1996, USA (28 pages).
McAfee Enterprise v. 1.0, Final Release Notes, Welcome to Me!, Mar. 1997 (31 pages).
McAfee, Inc., User's Guide- VirusScan for Windows 95, v3.0.0, Feb. 1997, USA (120 pages).
McAfee, Inc., McAfee Win 3.1/95/NT, Desktop Security Suite-Secure you PC from Viruses, Lost Data and Hackers, 1997, USA (2 pages).
McAfee, Inc., User's Guide- WebShield, v1.0.0, Sep. 1996, USA (46 pages).
Symantec Corporation, User's Guide- Norton AntiVirus for Internet Email Gateways, 1997-1998, USA (36 pages).
McAfee, Inc., Whatsnew 1, What's New in VirusScan Security Suite Version 3.0.0, 1994-1997 (6 pages).
McAfee Associates, Inc., Platinum Edition, VirusScan Security Suite, Total Desktop & Internet Protection, 1997 ( pages).
McAfee Associates, Inc., Users Guide- WebScanX for Windows 95 and Windows NT, v3.0.0, Jun. 1997 (23 pages).
McAfee, Inc., Users Guide- PCFirewall for Windows 95 and Windows NT, Version 2.0.0, Mar. 1997, USA (52 pages).
Debar, H. et al., Towards a Taxonomy of Intrusion-Detection System, Preprint submitted to Elsevier Preprint, Oct. 28, 1998, Switzerland (31 pages).
McAfee Associates, Inc., Whatsnew 2, What's New in VirusScan Security Suite Version 3.0.1, 1994-1997 (7 pages).
McAfee Associates, Inc., Whatsnew 3, What's New in VirusScan Security Suite Version 3.0.4, 1994-1997 (7 pages).
McAfee, Inc., Integrated Solutions for the NT Enterprise, VirusScan Security (VSS) Suite (Corporate), 1997 (6 pages).
McAfee Associates, Inc., Whatsnew 4, What's New in VirusScan Security Suite Version 3.1.1, 1994-1997, USA (7 pages).

McAfee Associates, Inc., Users Guide- WebScanX for Windows 3.1x, Windows 95, and Windows NT, v3.1.0, Aug. 1997, USA (73 pages).

McAfee, Inc., User's Guide- VirusScan for Windows 95, v3.1.0, May 1997, USA (150 pages).

McAfee, Inc,, User's Guide- NetShield for NetWare, v.3.0.2, Jul. 1997, USA (112 pages).

McAfee, Inc., Users Guide- NetShield for Windows NT, v2.5.2, Oct. 1996, USA (113 pages).

Network Associates, Inc., WebShield for Firewalls User's Guide, Version 3.1.6, May 1998, USA (45 pages).

Trend Micro Incorporated, User's Guide- InterScan VirusWall, Version 2.0 for Solaris, May 28, 1997 (201 pages).

Escamilla, T., Intrusion Detection- Network Security Beyond the Firewall, John Wiley & Sons, Inc., 1998, USA & Canada (359 pages).

WheelGroup Corporation, NetRanger 1.3 User's Guide, 1997, USA (301 pages).

Network Associates, Inc., User's Guide- WebShield SMTP for Windows NT, v3.1.0, Dec. 1997, USA (86 pages).

Network Associates, Inc., What's New in WebShield SMTP Special Edition v4.0.2 for Windows NT, 1994-1999, USA (21 pages).

Axent Technologies, Inc., User Manual- NetProwler, Version 3.0, May 25, 1999, USA (64 pages).

Porras, P. A. et al., Live Traffic Analysis of TCP/IP Gateways, Internet Society's Networks and Distributed Systems Security Symposium, Mar. 1998, USA, retrieved from http://www.sdl.sri.com/projects/emerald/live-traffic.html (12 pages).

Johner, H. et al., Understanding IBM SecureWay FirstSecure, International Technical Support Organization, www.redbooks.ibm.com, IBM Corporation, Nov. 1999, Austin, Texas (394 pages).

F-Secure Corporation, F-Secure Anti-Virus for Firewalls, Windows Version, Administrator's Guide, 1997-2001 (105 pages).

Check Point Software Technologies Ltd., Check Point FireWall-1™ Architecture and Administration, Version 4.0, Part No. 71300001400, Sep. 1998 (466 pages).

Internet Security Systems, Inc., Introduction to RealSecure Version 3.0, The Industry's Only Integrated Host-Based and Network-Based Intrusion Detection System, Jan. 29, 1999 (45 pages).

Forte, D., Intrusion-Detection Systems, Guaranteeing the Safety of a Network Beyond Using a Firewall, USENIX, Mar. 16, 1999, retrieved from http://www.usenix.org/publications/login/1999-2/intrusion.html (7 pages).

Schnackenberg, D. et al., Infrastructure for Intrusion Detection and Response, Proceedings of the DARPA Information Survivability Conference and Exposition, South Carolina, USA, Jan. 25-27, 2000 (9 pages).

Wood, M., Evolutionary Challenges Facing Network Intrusion Detection Systems, Slide show, Internet Security Systems, Sep. 14, 1998 (12 pages).

Internet Security Systems, Inc., Network-vs. Host-based Intrusion Detection: A Guide to Intrusion Detection Technology, Oct. 2, 1998 (10 pages).

Verwoerd, T., Active Network Security, Honours Report, Nov. 5, 1999 (53 pages).

WheelGroup Corporation, NetRanger 2.1.0 User's Guide, 1997-1998, USA (633 pages).

Network Associates, Inc., A Network Associates Executive White Paper, The Active Firewall- The End of the Passive Firewall Era (A Dynamic New Model for Integrated Active Responses Firewall Security), 1999 (16 pages).

Network Associates Technology, Inc., CyberCop Monitor Getting Started Guide, Version 2.0, for Windows NT 4.0, 1999 (76 pages).

Paxson, V., Bro: A System for Detecting Network Intruders in Real-Time, Lawrence Berkeley National Laboratory, Berkeley, CA and AT&T Center for Internet Research at ICSI, Appears in Computer Networks, vol. 31, Issue 23-24, pp. 2435-2463, Dec. 1999, Berkeley, California (34 pages).

Non-Final Office Action from U.S. Appl. No. 11/855,925, dated Aug. 26, 2010 (9 pages).

Seachrist, D. et al., Firewall Software for NT and Unix, Software Lab Report, Jun. 1997, pp. 130-134 (5 pages).

Schneier, B., Applied Cryptography, Second Edition, Protocols, Algorithms, and Source Code in C, John Wiley & Sons, Inc., 1996, Chapter 8 and 24, pp. 185-187 and pp. 574-579 (11 pages).

Ramteke, T., Networks, Prentice-Hall, Inc., Upper Saddle River, New Jersey, Chapter 19, pp. 430-436 (9 pages).

Tanenbaum, A. S., Computer Networks, Prentice-Hall, Inc., Englewood Cliffs, New Jersey, 1981, pp. 15-21 (10 pages).

Amoroso, E., Intrusion Detection, An Introduction to Internet Surveillance, Correlation, Trace Back, Traps, and Response, First Edition, Jan. 1999, Intrusion.Net Books, New Jersey, USA (218 pages).

Final Office Action Summary from U.S. Appl. No. 11/855,925 mailed on Dec. 10, 2009.

Advisory Action Summary from U.S. Appl. No. 11/855,925 mailed on Mar. 9, 2010.

* cited by examiner

SECURE GATEWAY WITH FIREWALL AND INTRUSION DETECTION CAPABILITIES

RELATED APPLICATION(S)

The present application is a continuation of an application filed Jun. 29, 2001 now U.S. Pat. No. 6,513,122 under Ser. No. 09/895,500, which is incorporated herein by reference.

FIELD OF THE INVENTION

The present invention relates to firewalls, and more particularly to firewalls having security capabilities.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service; and so forth.

Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

Prior art FIG. 1 illustrates a network architecture 100 in which a scanner may be implemented, in accordance with the prior art. As shown, a remote source 102 is provided which is coupled to a network such as the Internet 104 for scanning purposes. Also included is a plurality of target devices 106, i.e. computers, coupled to another network such as a virtual local area network (VLAN) 108, or some other type of "switched" network. In use, it is very difficult for the remote source 102 to access the target devices 106 due to a firewall 110 coupled between the Internet 104 and the LAN 108, thus frustrating the scanning procedure.

The firewall 110 is adapted for isolating the VLAN 108 and the target devices 106 from access through the Internet 104 attached thereto. The purpose of the firewall 110 is to allow the VLAN 108 and the target devices 106 to be attached to, and thereby access, the Internet 104 without rendering them susceptible to hostile access from the Internet 104. If successful, the firewall 110 allows for the VLAN 108 and the target devices 106 to communicate and transact with the Internet 104 without rendering them susceptible to attack or unauthorized inquiry over the Internet 104. One technique that may be used by the firewall 110 to protect the target devices 106 is known as an "access control list". An access control list investigates address information contained in a data packet to determine whether the remote source 102, from which the packet originated, is on a list of disallowed addresses. If the address is on the list, the packet is not allowed to pass. Yet another method of restricting access involves "packet filtering". Packet filtering examines data traversing the firewall 110 to determine if the port or protocol in use is subject to various restrictions that may be specified by the user. If the port or protocol in use is restricted, the packet is not allowed to pass.

The firewall 110 also may use an application gateway, or proxy system. Such systems operate on the basis of an application, or a computing platform's operating system (OS), monitoring "ports" receiving incoming connection requests. A port is a numerically designated element contained in the overhead of a packet. A port number indicates the nature of a service associated with a packet. For example, a packet associated with the Telnet service has a port number of 23, and the HTTP service is assigned port number 80. These port number designations are merely industry suggested. A packet containing a port designation of 23 need not necessarily be associated with Telnet services. When the OS or monitoring application receives a request on a particular port, a connection is opened on that port. A program for managing the connection is then initiated, and the firewall 110 starts a gateway application, or proxy, that validates the connection request.

Firewalls 110 typically restrict access based only on address/port/protocol information. Further, proxying firewalls 110 validate communications merely to ensure that requests conform to known standards (e.g. HTTP/1.x). Unfortunately, firewalls 110 do not typically examine content of communications for security purposes. There is thus a need for a firewall 110 that validates conforming communications to determine if the content of such communications could be part of an attempt to carry out an attack.

DISCLOSURE OF THE INVENTION

A system, method and computer program product are provided. Initially, data is received from a remote source which is destined for a target. A portion of such data is discarded based on a predetermined set of rules utilizing a firewall. Further, the data is compared to a predetermined list of data associated with attacks utilizing an intrusion detection system. Based on the comparison, some of the data is marked as hostile. The data that is marked as hostile is then acted upon in order to prevent an attack.

BRIEF DESCRIPTION OF THE DRAWINGS

Prior art

DESCRIPTION OF THE PREFERRED EMBODIMENTS

Figure 1:
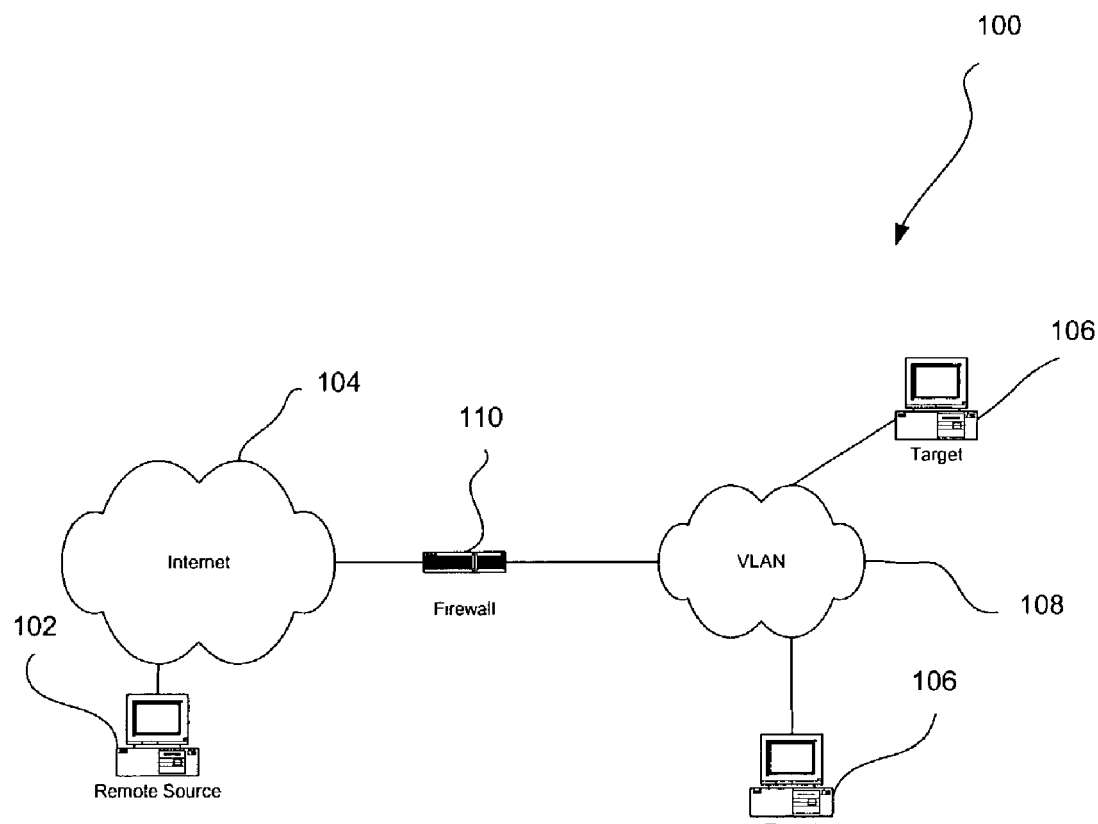
FIG. 1 illustrates a network architecture in which a scanner may be implemented, in accordance with the prior art.
Figure 2:
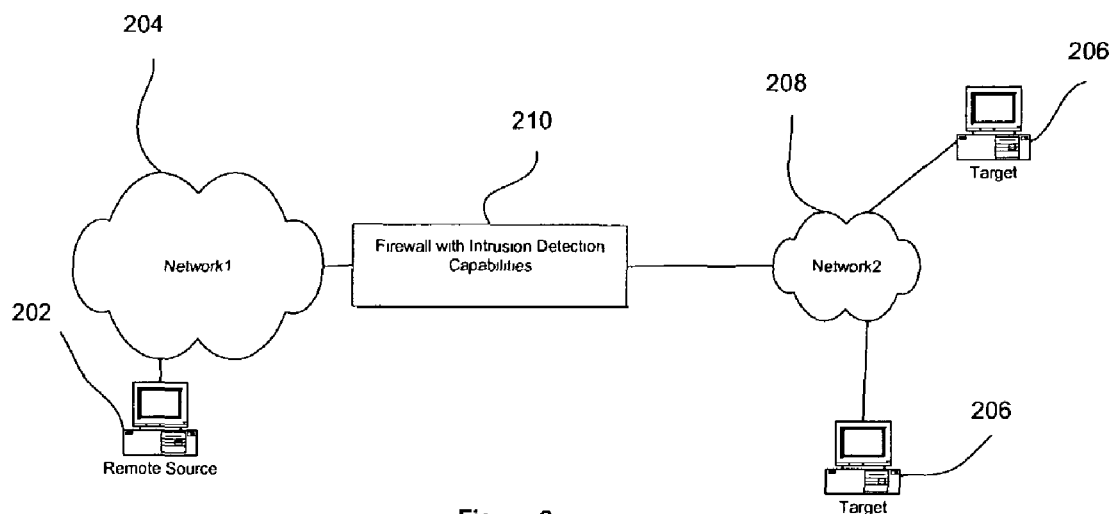
FIG. 2 illustrates a network architecture including a firewall device, in accordance with the one embodiment.

FIG. 2 illustrates a network architecture 200, in accordance with the one embodiment. As shown, a remote source 202 is provided which is coupled to a first network 204. Also included is a plurality of targets 206 coupled to a second network 208. In the context of the present network architecture 200, the first network 204 and the second network 208 may each take any form including, but not limited to a local area network (LAN), a wide area network (WAN) such as the Internet, etc. Further, the targets 206 may include desktop computers, lap-top computers, hand-held computers, printers or any other type of hardware/software.

In use, the remote source 202 may attempt to access any one of the targets 206 by way of firewall device 210 coupled between the first network 204 and the second network 208 for communication purposes, i.e. executing a scanning procedure. In one embodiment, the firewall device 210 may also incorporate an application gateway, or proxy system.

Figure 3:
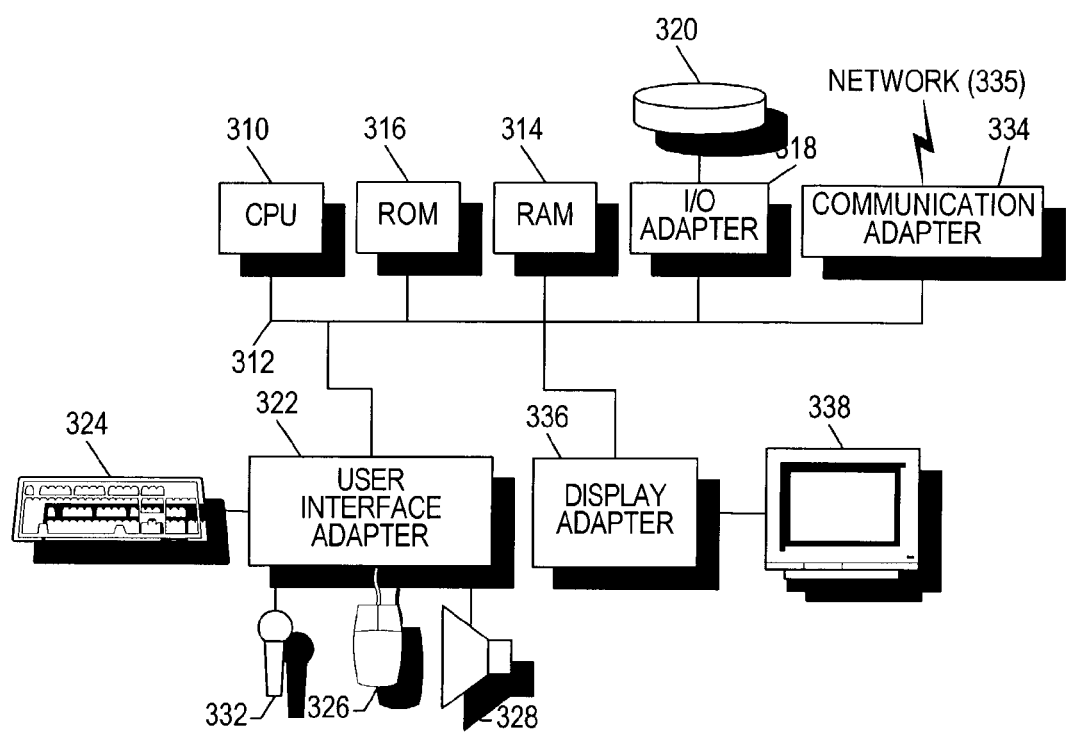
FIG. 3 shows a representative hardware environment associated with the components of FIG. 2, in accordance with one embodiment.

FIG. 3 shows a representative hardware environment that may be associated with the remote source 202 and/or targets 206 of FIG. 2, in accordance with one embodiment. Such figure illustrates a typical hardware configuration of a workstation in accordance with a preferred embodiment having a central processing unit 310, such as a microprocessor, and a number of other units interconnected via a system bus 312.

The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network 335 (e.g., a data processing network) and a display adapter 336 for connecting the bus 312 to a display device 338.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 4:
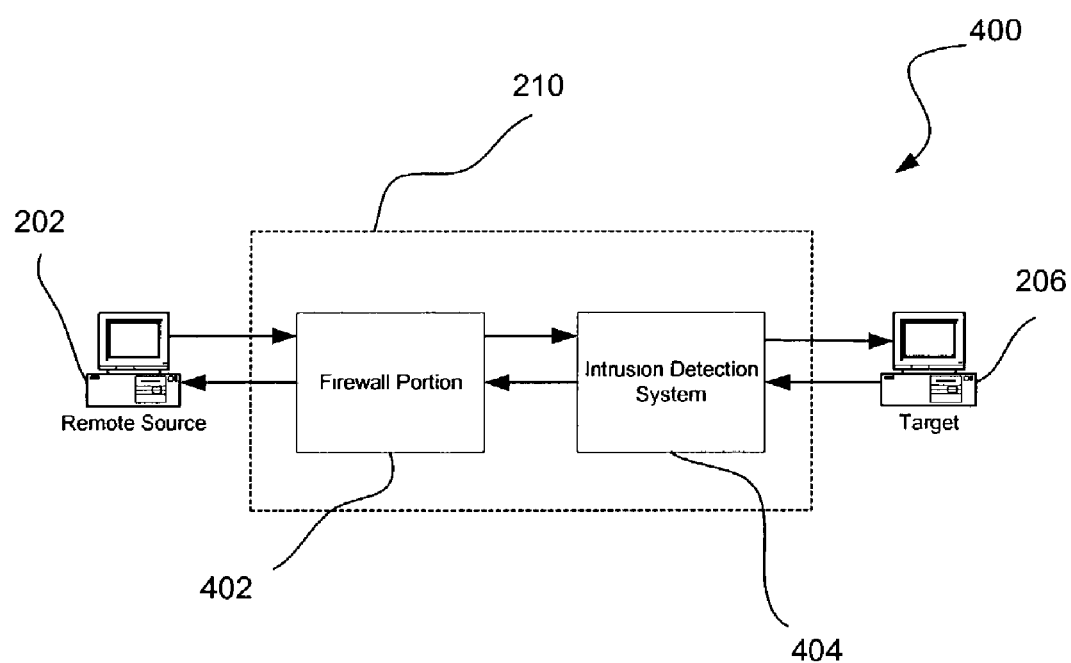
FIG. 4 illustrates an exemplary firewall architecture associated with the firewall device of FIG. 2.

FIG. 4 illustrates an exemplary firewall architecture 400 associated with the firewall device 210 of FIG. 2, in accordance with one embodiment. As shown, the firewall architecture 400 includes a firewall portion 402 and an intrusion detection system 404 serially coupled between the remote source 202 and the targets 206 via the associated networks. In particular, the remote source 202 is coupled to the firewall portion 402 which, in turn, is coupled to the intrusion detection system 404 that communicates with the targets 206.

In use, the firewall portion 402 of the firewall architecture 400 is capable of packet filtering. As mentioned earlier, packet filtering involves the investigation of port or protocol information contained in a data packet to determine whether the remote source 202, from which the packet originated, is permitted to communicate via the network in this manner. If the port or protocol is restricted, the packet is not allowed to pass. Moreover, the firewall portion 402 may also serve as a gateway, or proxy system.

Accordingly, the firewall portion 402 may utilize a predetermined set of rules to discard received data as a function of a plurality of parameters such as a source, a destination, and/or a port associated with data. Remaining data is subsequently passed to the intrusion detection system 404. For reasons that will soon become apparent, the firewall portion 402 is capable of generating a session flag upon the receipt of packets that represent the start of a new session. In the context of the present description, a session refers to a series of interactions between the remote source 202 and any one of the targets 206.

Figure 5:
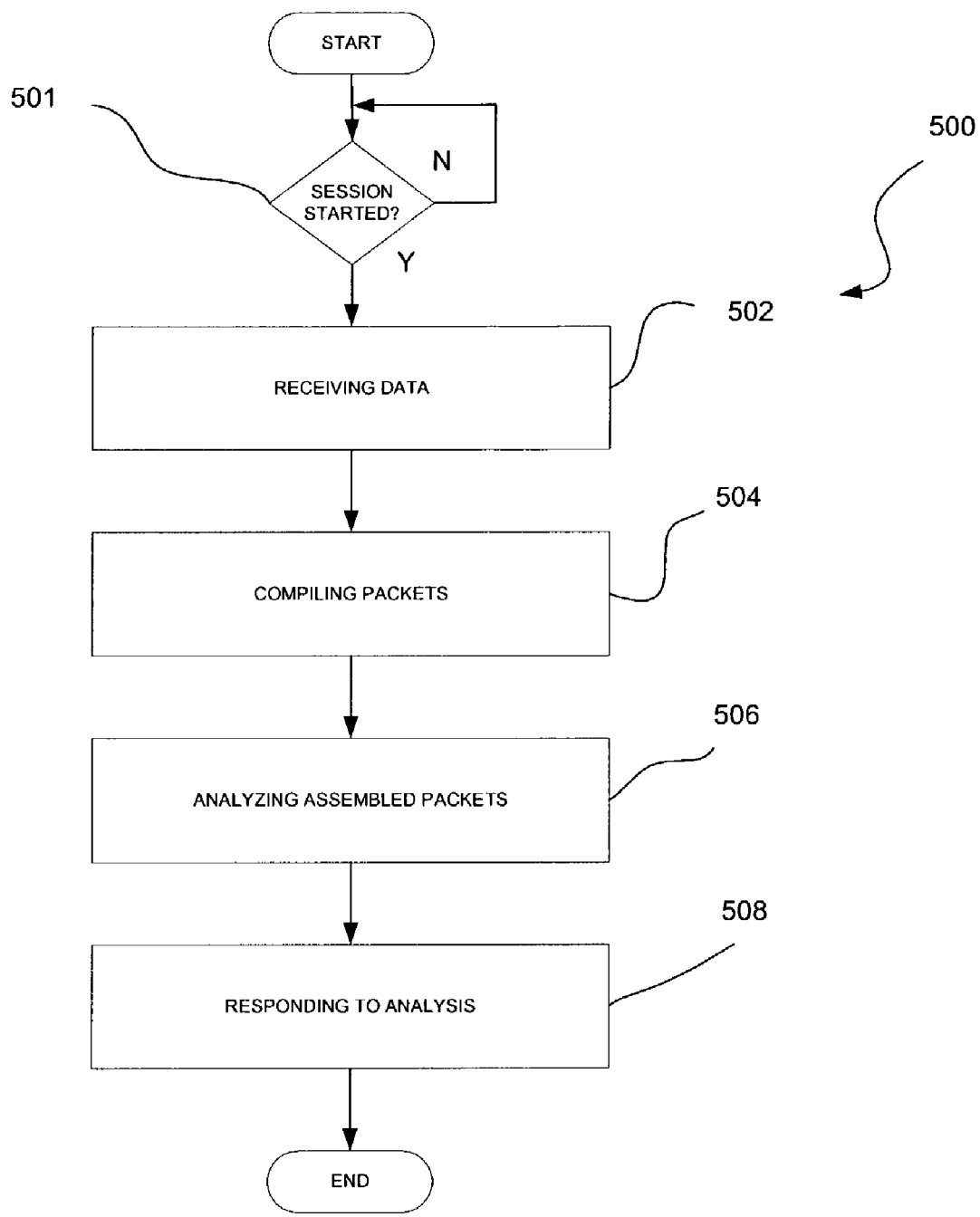
FIG. 5 illustrates a method for detecting attacks on a network which is carried out by the intrusion detection system of FIG. 4.

FIG. 5 illustrates a method 500 carried out by the intrusion detection system 404 of FIG. 4 for detecting attacks on a network. Initially, it is determined whether a session has been started in decision 501. In one embodiment, the firewall portion 402 of the firewall architecture 400 is capable of polling until the receipt of the aforementioned session flag from the firewall portion 402 of the firewall architecture 400.

Upon the start of a session, data is received from the remote source 202 which is destined for one of the targets 206. See operation 502. As mentioned earlier, a portion of such data is previously discarded based on the predetermined set of rules utilizing the firewall portion 402 of the firewall architecture 400. It should be noted that the data currently takes the form of a plurality of packets. In order for the intrusion detection system 404 to more effectively accomplish its task, the packets are compiled, or assembled, in operation 504. This may be accomplished utilizing the header information associated with each packet in a manner that is well known to those of ordinary skill in the art of Transmission Control Protocol/Internet Protocol (TCP/IP).

Next, the assembled packets are analyzed in operation 506 for the purpose of identifying content that may be harmful to known vulnerabilities of the target devices 206. More information regarding such analysis will be set forth in greater detail during reference to FIG. 6. Once the analysis is complete, the intrusion detection system 404 is capable of responding to an intrusion in operation 508, as will be elaborated upon during reference to FIG. 7.

Figure 6:
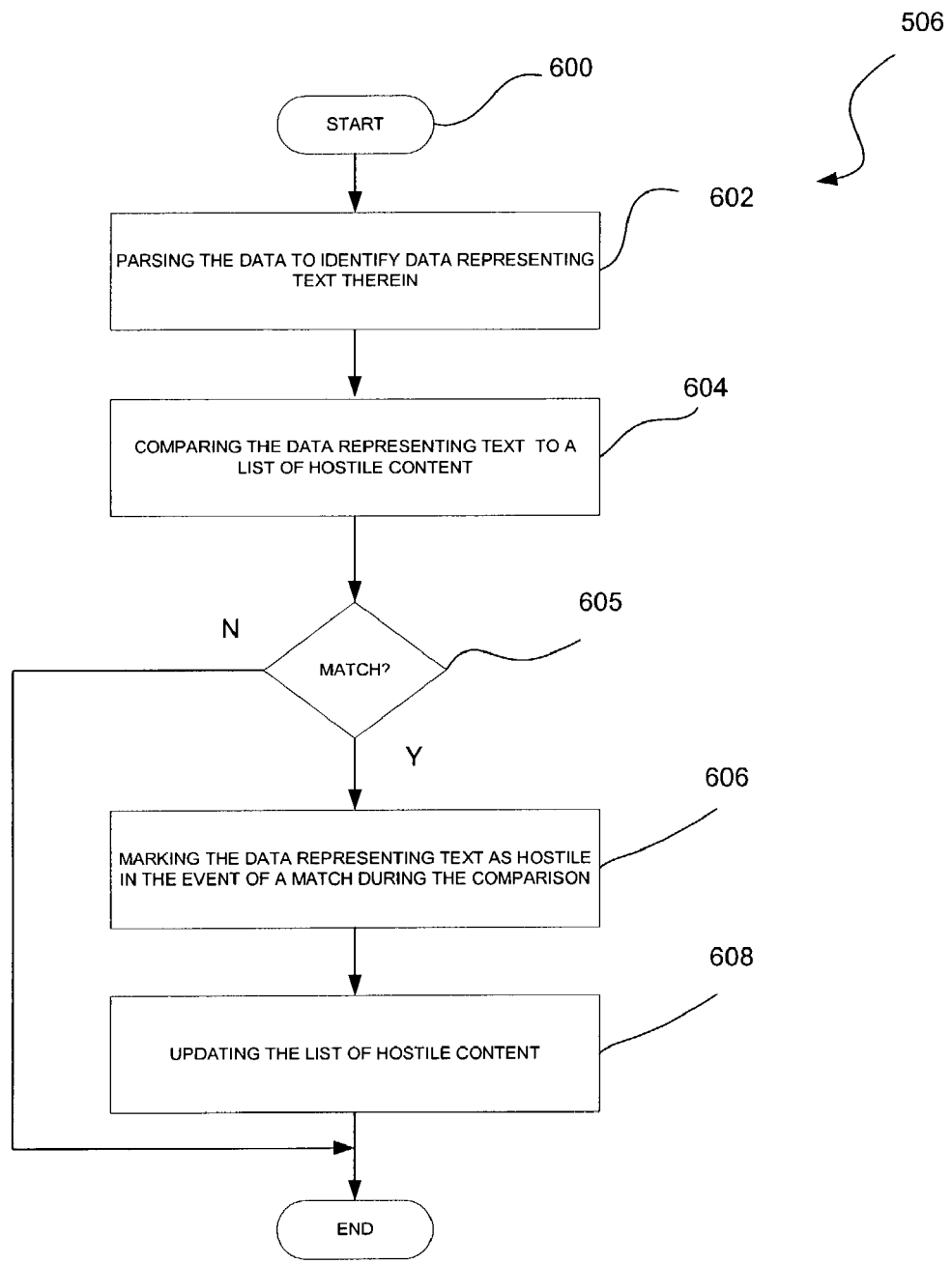
FIG. 6 illustrates a method of analyzing data in accordance with the method of FIG. 5.

FIG. 6 illustrates a method 600 of analyzing data in accordance with operation 506 of FIG. 5. As shown, the compiled data is parsed in operation 602 to identify data representing text (i.e. ASCII, UNICODE, or any other type of text, etc.) therein utilizing the intrusion detection system 404. It should be noted that such text may take the form of password requests, file requests, etc.

Thereafter, the data representing text is compared to a predetermined list of data representing text associated with attacks utilizing the intrusion detection system 404. Note operation 604. Table 1 illustrates an exemplary list of data representing text that may be associated with attacks.

TABLE 1

Common Linux Shellcode
"\xeb\x1f\x5e\x89\x76\x08\x31\xc0\x88\x46\x07\x89\x46\x0c\xb0\x0b"
"\x89\xf3\x8d\x4e\x08\x8d\x56\x0c\xcd\x80\x31\xdb\x89\xd8\x40\xcd"
"\x80\xe8\xdc\xff\xff\xff/bin/sh"
  (or simply requests ending with the text /bin/sh)
Well-known vulnerability in IIS Web Server
"/scripts/..%c0%af../winnt/system32/cmd.exe"

TABLE 1-continued (or simply requests which contain requests from /scripts and end with
/winnt/system32/cmd.exe)
Shellcode for x86 Computer Processor Architecture
Excessive numbers of consecutive 0x90 ("noop") bytes.
Shellcode for Sparc Computer Processor Architecture
Excessive numbers of consecutive sets of four bytes:
0xa61cc013

It should be noted that the data representing text of the predetermined list may refer to different types of attacks. For example, the types of attacks may include information gathering attacks, a web server denial of service attack, a file server remote compromise, and/or any other type of attack. Table 2 illustrates a non-exhaustive list of additional types of attacks that may be addressed in Table 1.

TABLE 2

| | |
|---|---|
| SYN Flood attack | Ping of death (fat ping attack) |
| IP spoofing | Malformed packet attacks(both TCP/UDP) |
| ACK storms | Forged source address packets |
| Network probes | Packet fragmentation attacks |
| Session hijacking | Log overflow attacks |
| SNMP attacks | Log manipulation |
| ICMP broadcast flooding | Source routed packets |
| Land attack | DNS cache corruption |
| ARP attacks | Mail spamming |
| Ghost routing attacks | DNS denial of service |
| Sequence number predict | FTP bounce or port call attack |
| Buffer overflows | ICMP protocol tunneling |
| Mail exploits | VPN key generation attacks |
| Authentication race attacks | |

In an alternate embodiment, the data may be parsed in operation 602 to identify binary data representing protocol field values. As such, the binary data may be compared to a predetermined list of patterns of binary data associated with attacks in operation 604. By this design, the present embodiment is capable of identifying harmful content in binary data streams (e.g. telnet, dns, etc).

Based on the comparison of operation 604, some of the data representing text is marked as hostile. See decision 605. In particular, if any of the data representing text identified in operation 602 matches any of the data representing text of the list (see Table 1), such matched data representing text is marked as hostile, as indicated in operation 606. Thereafter, the marked data representing text may be acted upon in order to prevent the attack, as indicated in operation 508 of FIG. 5. For reasons that will soon become apparent, the matching data representing text may be marked with an identifier corresponding to the type of the attack.

As an option, in operation 608, the predetermined list of data representing text associated with attacks (see Table 1) may be capable of being updated. Such update may be accomplished in any desired manner. For example, an administrator may update the appropriate file locally, or from afar utilizing the network. This may be accomplished in an automated, manual, and/or periodic manner.

Figure 7:
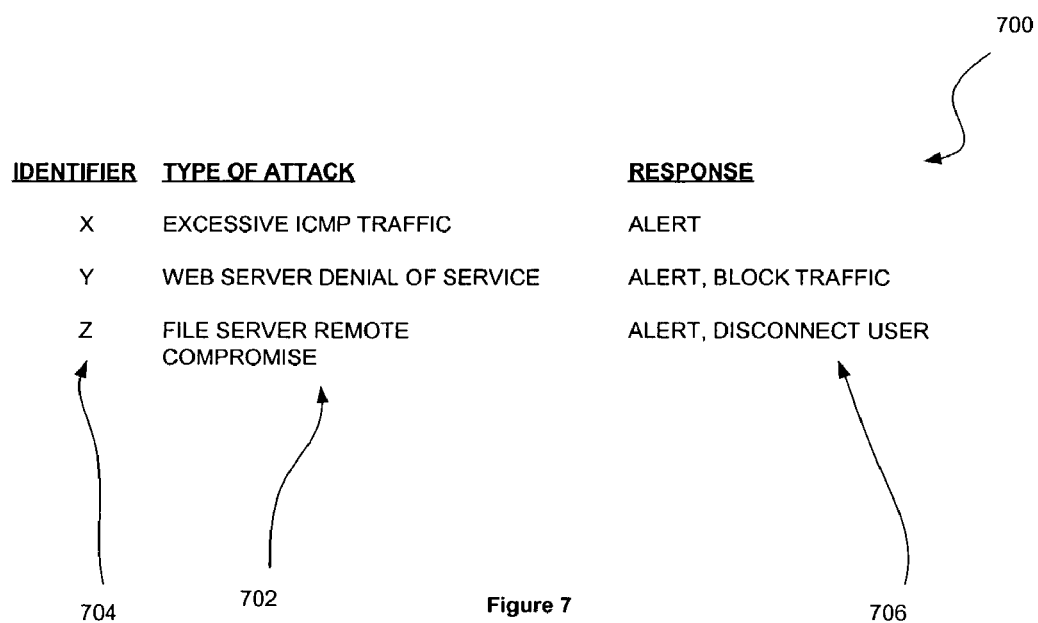
FIG. 7 illustrates an exemplary table dictating the manner in which the intrusion detection system responds to a hostile data representing text, in accordance with the method of FIG. 5.

FIG. 7 illustrates an exemplary table 700 dictating the manner in which the intrusion detection system 404 responds to the hostile data representing text, in accordance with operation 508 of FIG. 5. As shown, such table 700 outlines a plurality of types of attacks 702 each with an associated identifier 704. As mentioned earlier, the types of attacks 702 may include, but are not limited to information gathering attacks, a web server denial of service attack, a file server remote compromise, and/or any other type of attack on the targets 206. When the data representing text is identified as one of such hostile attacks 702, the data is assigned the appropriate identifier 704.

Given the appropriate identifier in operation 508 of FIG. 5, the intrusion detection system 404 is capable of determining the appropriate response 706. In one embodiment, responses may include alerting an administrator, blocking the data, disconnecting the remote source 102, and/or any other reaction to the hostile data.

In one exemplary embodiment, an information gathering attack may prompt an administrator alert. Further, a web server denial of service attack may warrant an administrator alert and/or a data block. Still yet, a file server remote compromise may result in the remote source 102 being disconnected and/or an alert being sent to the administrator.

The specific location and functionality of the intrusion detection system 404 is thus designed to analyze all traffic, regardless of type, and identify data that may be part of an attack against the targets 206 to be protected. By its incorporation with the firewall architecture 400, the intrusion detection system 404 is capable of analyzing all incoming data and identifying threats before hostile data reaches a switched or segmented network, i.e. VLAN, that would otherwise render the data invisible to a conventional intrusion detection system 404.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting attacks on a network, comprising:

receiving data at a gateway from a remote source, the data destined for a target;

discarding at least a portion of the data based on a predetermined set of rules utilizing a firewall associated with the gateway which is coupled to the remote source, wherein the firewall utilizes the predetermined set of rules to discard the at least a portion of data as a function of a plurality of parameters selected from the group consisting of a source, a destination, and a port associated with the data;

passing that portion of the data not discarded to an intrusion detection system coupled to the firewall;

receiving the portion of data not discarded utilizing the intrusion detection system;

parsing the portion of data not discarded to identify data representing text therein utilizing the intrusion detection system;

comparing the portion of data not discarded representing text to a predetermined list of data representing text associated with attacks utilizing the intrusion detection system, wherein the data representing text of the predetermined list refers to different types of attacks selected from the group consisting of information gathering attacks, a web server denial of service attack, and a file server remote compromise;

identifying the portion of data not discarded representing text as hostile based on the comparison;

acting on the portion of data not discarded representing text identified as hostile in order to prevent an attack, wherein the portion of data not discarded representing text identified as hostile is acted upon differently based on the type of the attack by at least one of blocking the data, alerting an administrator, and disconnecting the remote source; and updating the predetermined list of data representing text associated with attacks;

wherein the firewall and the intrusion detection system are included in a single device;

wherein the portion of data not discarded representing text identified as hostile is marked with an identifier from a table based on the comparison, the identifier being used to determine the manner in which the data representing text identified as hostile is acted upon;

wherein the text includes ASCII characters and UNICODE characters;

wherein the comparing, identifying, and acting further involves binary data, in order to identify binary data that is hostile;

wherein the portion of data not discarded is assembled utilizing the intrusion detection system using header information associated with one or more packets comprising the portion of data not discarded.

2. The method as recited in claim 1, wherein the firewall utilizes the predetermined set of rules to discard the at least a portion of data as a function of a plurality of parameters including the source, the destination, and the port associated with the data.

3. The method as recited in claim 1, wherein the data representing text of the predetermined list refers to different types of attacks including the information gathering attacks, the web server denial of service attack, and the file server remote compromise.

4. The method as recited in claim 1, wherein the predetermined list of data representing text associated with attacks is manually updated.

5. The method as recited in claim 1, wherein the attacks include a SYN flood attack, ping of death, IP spoof, malformed packet attack, ACK storm, forged source address attack, network probe, packet fragmentation attack, session hijack, log overflow attack, SNMP attack, log manipulation, ICMP broadcast flooding, source routed packet, land attack, DNS cache corruption, ARP attack, mail spamming attack, ghost routing attack, DNS denial of service, sequence number predict, FTP bounce attack, port call attack, buffer overflow, ICMP protocol tunnel, mail exploit, VPN key generation attack, and authentication race attack.

6. A gateway system for detecting attacks on a network, comprising:
    a firewall for receiving data from a remote source, the data destined for a target, and discarding at least a portion of the data based on a predetermined set of rules, wherein the firewall utilizes the predetermined set of rules to discard the at least a portion of data as a function of a plurality of parameters selected from the group consisting of a source, a destination, and a port associated with the data;
    an intrusion detection system coupled to the firewall for receiving that portion of the data not discarded, parsing the portion of data not discarded to identify data representing text therein, and comparing the portion of data not discarded representing text to a predetermined list of data representing text associated with attacks, wherein the data representing text of the predetermined list refers to different types of attacks selected from the group consisting of information gathering attacks, a web server denial of service attack, and a file server remote compromise, the intrusion detection system further capable of identifying the portion of data not discarded representing text as hostile based on the comparison, and acting on the portion of data not discarded representing text identified as hostile in order to prevent an attack, wherein the portion of data not discarded representing text identified as hostile is acted upon differently based on the type of the attack by at least one of blocking the data, alerting an administrator, and disconnecting the remote source, the intrusion detection system further capable of updating the predetermined list of data representing text associated with attacks;

wherein the firewall and the intrusion detection system are included in a single device;

wherein the portion of data not discarded representing text identified as hostile is marked with an identifier from a table based on the comparison, the identifier being used to determine the manner in which the portion of data not discarded representing text identified as hostile is acted upon;

wherein the text includes ASCII characters and UNICODE characters;

wherein the comparing, identifying, and acting further involves binary data, in order to identify binary data that is hostile;

wherein the portion of data not discarded is assembled utilizing the intrusion detection system using header information associated with one or more packets comprising the portion of data not discarded.

7. The system as recited in claim 6, wherein the firewall utilizes the predetermined set of rules to discard the at least a portion of data as a function of a plurality of parameters including the source, the destination, and the port associated with the data.

8. The system as recited in claim 6, wherein the data representing text of the predetermined list refers to different types of attacks including the information gathering attacks, the web server denial of service attack, and the file server remote compromise.

9. The system as recited in claim 6, wherein the predetermined list of data representing text associated with attacks is manually updated.

10. The system as recited in claim 6, wherein the attacks include a SYN flood attack, ping of death, IP spoof, malformed packet attack, ACK storm, forged source address attack, network probe, packet fragmentation attack, session hijack, log overflow attack, SNMP attack, log manipulation, ICMP broadcast flooding, source routed packet, land attack, DNS cache corruption, ARP attack, mail spamming attack, ghost routing attack, DNS denial of service, sequence number predict, FTP bounce attack, port call attack, buffer overflow, ICMP protocol tunnel, mail exploit, VPN key generation attack, and authentication race attack.

11. A computer program product embodied on a non-transitory computer readable medium for detecting attacks on a network, comprising:
    firewall computer code for receiving data from a remote source, the data destined for a target, and discarding at least a portion of the data based on a predetermined set of rules, wherein the firewall computer code utilizes the predetermined set of rules to discard the at least a portion of data as a function of a plurality of parameters selected from the group consisting of a source, a destination, and a port associated with the data;
    intrusion detection system computer code in communication with the firewall computer code for receiving that portion of the data not discarded, parsing the portion of data not discarded to identify data representing text therein, and comparing the portion of data not discarded representing text to a predetermined list of data representing text associated with attacks, wherein the data representing text of the predetermined list refers to different types of attacks selected from the group consisting of information gathering attacks, a web server denial of service attack, and a file server remote compromise, the intrusion detection system computer code further capable of identifying the portion of data not discarded representing text as hostile based on the comparison, and acting on the portion of data not discarded representing text identified as hostile in order to prevent an attack, wherein the portion of data not discarded representing text identified as hostile is acted upon differently based on the type of the attack by at least one of blocking the data, alerting an administrator, and disconnecting the remote source, the intrusion detection system computer code further capable of updating the predetermined list of data representing text associated with attacks;

wherein the firewall and the intrusion detection system are included in a single device;

wherein the portion of data not discarded representing text identified as hostile is marked with an identifier from a table based on the comparison, the identifier being used to determine the manner in which the portion of data not discarded representing text identified as hostile is acted upon;

wherein the text includes ASCII characters and UNICODE characters;

wherein the comparing, identifying, and acting further involves binary data, in order to identify binary data that is hostile;

wherein the portion of data not discarded is assembled utilizing the intrusion detection system using header information associated with one or more packets comprising the portion of data not discarded.

12. The computer program product as recited in claim 11, wherein the firewall computer code utilizes the predetermined set of rules to discard the at least a portion of data as a function of a plurality of parameters including the source, the destination, and the port associated with the data.

13. The computer program product as recited in claim 11, wherein the data representing text of the predetermined list refers to different types of attacks including the information gathering attacks, the web server denial of service attack, and the file server remote compromise.

14. The computer program product as recited in claim 11, wherein the predetermined list of data representing text associated with attacks is manually updated.

15. The computer program product as recited in claim 11, wherein the attacks include a SYN flood attack, ping of death, IP spoof, malformed packet attack, ACK storm, forged source address attack, network probe, packet fragmentation attack, session hijack, log overflow attack, SNMP attack, log manipulation, ICMP broadcast flooding, source routed packet, land attack, DNS cache corruption, ARP attack, mail spamming attack, ghost routing attack, DNS denial of service, sequence number predict, FTP bounce attack, port call attack, buffer overflow, ICMP protocol tunnel, mail exploit, VPN key generation attack, and authentication race attack.

16. The method as recited in claim 1, wherein the identifier corresponds to the type of the attack associated with the portion of data not discarded representing text identified as hostile.

17. The method as recited in claim 1, wherein an excessive ICMP traffic attack initiates a response including an alert.

18. The method as recited in claim 1, wherein a web server denial of service attack initiates a response including an alert and blocking traffic.

19. The method as recited in claim 1, wherein a file server remote compromise attack initiates a response including an alert and disconnecting a user.

20. The method as recited in claim 1, wherein the table outlines a plurality of identifiers, a plurality of types of attacks and a plurality of responses, wherein each identifier of the plurality of identifiers is associated with a particular type of attack and at least one response.

\* \* \* \* \*

UNITED STATES PATENT AND TRADEMARK OFFICE
CERTIFICATE OF CORRECTION

| | | |
|---|---|---|
| PATENT NO. | : 8,176,553 B1 | Page 1 of 1 |
| APPLICATION NO. | : 10/294255 | |
| DATED | : May 8, 2012 | |
| INVENTOR(S) | : Magdych et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2472 days.

Signed and Sealed this
Twenty-fifth Day of September, 2012

David J. Kappos
*Director of the United States Patent and Trademark Office*